United States Patent [19]

Sawa et al.

[11] Patent Number: 5,436,380
[45] Date of Patent: Jul. 25, 1995

[54] PROCESS FOR PRODUCING AROMATIC HYDROCARBONS

[75] Inventors: Masahiko Sawa; Yasushi Wakushima; Kozo Takatsu, all of Sodegaura, Japan

[73] Assignee: Idemitsu Kosan, Co., Ltd., Tokyo, Japan

[21] Appl. No.: 177,720

[22] Filed: Jan. 5, 1994

Related U.S. Application Data

[63] Continuation of Ser. No. 25,556, Mar. 3, 1993, abandoned.

[30] Foreign Application Priority Data

Mar. 11, 1992 [JP] Japan .................................. 4-052590
Jan. 29, 1993 [JP] Japan .................................. 5-013022

[51] Int. Cl.$^6$ .............................................. C07C 2/82
[52] U.S. Cl. .................................. 585/407; 585/411; 585/415
[58] Field of Search ........................ 585/407, 411, 415

[56] References Cited

U.S. PATENT DOCUMENTS

| | | | |
|---|---|---|---|
| 3,175,967 | 3/1965 | Miale et al. | 208/120 |
| 5,122,357 | 6/1992 | Bedard et al. | 423/518 |
| 5,151,259 | 9/1992 | Blom | 423/328 |
| 5,202,513 | 4/1993 | Kanai | 585/407 |

FOREIGN PATENT DOCUMENTS

| | | |
|---|---|---|
| 0299392 | 1/1989 | European Pat. Off. . |
| 0323132 | 7/1989 | European Pat. Off. . |
| 0434052 | 6/1991 | European Pat. Off. . |
| WO93/04145 | 3/1993 | European Pat. Off. . |

*Primary Examiner*—P. Achutamurthy
*Attorney, Agent, or Firm*—Frishauf, Holtz, Goodman & Woodward

[57] ABSTRACT

A process for producing aromatic hydrocarbons comprises bringing hydrocarbons having 2 to 12 carbon atoms into contact with a modified crystalline galloaluminosilicate catalyst prepared by treating a crystalline galloaluminosilicate having a tool ratio of $SiO_2/(Ga_2O_3+Al_2O_3)$ in the range from 5 to 1000 with a sulfur-containing substance. The process of the invention is simple and suited for general application and the catalyst can be prepared at a low cost. Aromatic hydrocarbons can be produced efficiently from the material hydrocarbons by bringing them into contact with the modified galloaluminosilicate having the excellent catalytic activity. The process of the invention can be adopted widely and effectively in the petroleum refining, in the petroleum chemistry and in the chemical industry in general.

7 Claims, No Drawings

PROCESS FOR PRODUCING AROMATIC HYDROCARBONS

This application is a continuation of application Ser. No. 08/025,556, filed Mar. 3, 1993, abandoned.

BACKGROUND OF THE INVENTION

1. Field of the Invention

The present invention relates to a novel process for producing aromatic hydrocarbons. More particularly, it relates to a process for efficiently producing aromatic hydrocarbons from hydrocarbons having 2 to 12 carbon atoms, particularly from aliphatic hydrocarbons having 2 to 12 carbon atoms by bringing them into contact with a modified crystalline galloaluminosilicate prepared by a specific treatment.

2. Description of the Related Arts

Zeolite catalysts of various kinds have heretofore been industrially very useful catalysts because they show high activities to catalytic rearrangement reactions of organic compounds. Particularly, crystalline silicates containing gallium have been known to exhibit excellent catalytic activity in the production of aromatic hydrocarbons from various hydrocarbon materials, such as hydrocarbons having 2 to 12 carbon atoms. Therefore, many processes for preparation and modification of the catalysts of this kind have been proposed.

For example, a process for production of aromatic hydrocarbons from a hydrocarbon material having 2 to 4 carbon atoms by bringing the material into contact with a crystalline galloaluminosilicate catalyst modified with steam is disclosed in PCT Japanese Application Laid-Open No. 501357/1985. However, this process has problems that yield of the aromatic hydrocarbons is low and that catalyst life is short.

As another example, a process for production of aromatic hydrocarbons from an aliphatic hydrocarbon material containing 50% or more of paraffins having 2 to 4 carbon atoms by bringing the material into contact with a catalyst prepared from a crystalline siliceous gallium having a mol ratio of $SiO_2/Ga_2O_3$ in the range from 25 to 250 and a mol ratio of $Y_2O_3/Ga_2O_3$ of less than I (Y is an atom like Al, Fe, Co, Cr and the like) by adsorption of 0.1 to 5 weight % of cokes on the catalyst, followed by a treatment of contact with gas containing oxygen at a temperature of 350° to 700° C., without repeating or with repeating of these treatments up to several times, is disclosed in Japanese Patent Application Laid-Open No. 98022/1984. However, this process has problems that a multi-stage treatment is required for the preparation of the catalyst and the operation of the preparation is complicated, that yield of the aromatic hydrocarbons is insufficient and that catalyst life is not satisfying.

As still another example, a process for production of aromatic hydrocarbons from a hydrocarbon material having 2 to 12 carbon atoms by bringing the material into contact with a crystalline galloaluminosilicate catalyst calcined at a high temperature of 700° to 1000° C. is proposed in Japanese Patent Application Laid-Open No. 103916/1989. However, this process requires a high temperature of 700° C. or more for the preparation of the catalyst and is not desirable because of the higher cost of the catalyst preparation.

SUMMARY OF THE INVENTION

The object of the present invention is to provide a process which can overcome the problems described above and can produce aromatic hydrocarbons efficiently from hydrocarbon materials, particularly from aliphatic hydrocarbon materials, by bringing them into contact with a catalyst obtained by a simple preparation.

In the course of study to accomplish the above object, the present inventors have found that the object can be accomplished by using a catalyst prepared from a specific crystalline galloaluminosilicate having a specified composition by treatment with a sulfur-containing substance and the present invention was completed on the basis of this discovery.

The present invention provides a process for producing aromatic hydrocarbons which comprises bringing hydrocarbons having 2 to 12 carbon atoms into contact with a modified crystalline galloaluminosilicate catalyst prepared by treating a crystalline galloaluminosilicate having a mol ratio of $SiO_2/(Ga_2O_3+Al_2O_3)$ in the range from 5 to 1000 with a sulfur-containing substance.

Other and further objects, features and advantages of the invention will appear more fully from the following description.

DESCRIPTION OF PREFERRED EMBODIMENTS

The crystalline galloaluminosilicate utilized in the invention comprises gallium, aluminum and silicon as the essential components thereof and has a mole ratio of $SiO_2/(Ga_2O_3+Al_2O_3)$ in the range from 5 to 1000, preferably in the range from 10 to 500, when it is expressed as a composition made of oxides.

When the mol ratio of $SiO_2/(Ga_2O_3+Al_2O_3)$ is smaller than 5, the crystalline galloaluminosilicate having such a tool ratio is not easily prepared and, even when it is prepared, it cannot be utilized as the catalyst because it is destroyed very easily. When the mol ratio of $SiO_2/(Ga_2O_3+Al_2O_3)$ is larger than 1000, it is not suitable as the catalyst because the catalytic activity is low.

The crystalline galloaluminosilicate can be prepared by generally known methods, such as hydrothermal synthesis from a mixture containing a silicon source (a silica source), a gallium source, an aluminum source, an alkali metal source and an organic crystallization agent.

The conditions of the hydrothermal synthesis are not particularly limited but the material composition is heated to a temperature at a pressure for a time which are necessary for the formation of the crystalline galloaluminosilicate. The hydrothermal reaction is generally conducted under stirring and may be conducted in an atmosphere of an inert gas.

As the silicon source, various kinds of material can be utilized. Examples of the material as the silicon source are silicic acid, condensation products of silicic acid and silicates, such as a silica powder, a colloidal silica, a fused silica, water glass and the like. As the gallium source, various kinds of material can also be utilized, such as gallium nitrate, gallium oxide and the like. Examples of the aluminum source are aluminum sulfate, sodium aluminate, colloidal alumina, alumina and the like. Examples of the alkali metal source are sodium chloride, potassium chloride, calcium chloride, magnesium chloride and the like.

The crystalline galloaluminosilicate can be prepared by various methods, such as (1) the method of preparation from a material mixture comprising inorganic compounds alone (without addition of an organic crystallization agent) and (2) the method of preparation from a material mixture additionally containing an organic crystallization agent.

The kind of the organic crystallization agent is not particularly limited but crystallization agents generally utilized for preparation of zeolites having the ZSM-5 type crystal structure can be adopted. Various organic compounds can be utilized as the crystallization agent. Examples of such organic compounds are quaternary alkylammonium salts, such as tetramethylammonium bromide, tetraethylammonium bromide, monoethyltrimethylammonium bromide, tetra-n-propylammonium bromide, tetra-i-propylammonium bromide, tetrabutylammonium bromide, monobenzyltriethylammonium bromide and the like, primary alkylamines, secondary alkylamines, tertiary alkylamines, alcoholamines, such as choline and the like, alcohols, ethers, amides and the like. Quaternary alkylammonium salts are preferably utilized among them.

In the hydrothermal synthesis, an aqueous mixture is prepared by adding the sources described above and, when necessary, the crystallization agent to water or to an aqueous medium comprising water as the main component thereof and then subjected to the hydrothermal reaction to obtain the crystalline galloaluminosilicate.

In the invention, the crystalline galloaluminosilicate is treated with a sulfur-containing substance. As the sulfur-containing substance, various substances, such as sulfuric acid, ammonium sulfate, hydrogen sulfide, dimethyl sulfide, diethyl sulfide, ethylmercaptan, diethyl sulfate, thioacetic acid, thiophene and the like, can be favorably utilized.

Various methods can be adopted for the treatment of the crystalline galloaluminosilicate with the sulfur-containing substance. In a preferable method, the crystalline galloaluminosilicate, with or without calcination at 400° to 700° C. in advance to remove organic components, is impregnated with a solution containing 0.01 mol or more, preferably 0.1 to 2.0 mol, of the sulfur-containing substance and then calcined at a temperature of 300° to 700° C., preferably of 350° to 600° C., for 0.5 hours or more, preferably for 1 to 6 hours, while the material composition still comprises the sulfur-containing substance therein.

In another method, the crystalline galloaluminosilicate, with or without calcination at 400° to 700° C. in advance to remove organic components, is treated in a gas stream containing the sulfur-containing substance and then calcined at a temperature of 300° to 700° C., preferably of 350° to 600° C., for 0.5 hours or more, preferably for 1 to 6 hours.

In the process for production of aromatic hydrocarbons of the invention, hydrocarbons having 2 to 12 carbon atoms are brought into contact with the aforementioned modified crystalline galloaluminosilicate to produce aromatic hydrocarbons efficiently.

As the hydrocarbons having 2 to 12 carbon atoms utilized as the material in the process of production of the invention, various kinds of hydrocarbons can be utilized. Examples of the material hydrocarbons are aliphatic hydrocarbons, such as paraffinic hydrocarbons, olefinic hydrocarbons, acetylenic hydrocarbons and the like, cycloparaffinic hydrocarbons, cycloolefinic hydrocarbons and the like. A single kind of the material hydrocarbon or a mixture of more than one kinds may be utilized. Though the material hydrocarbons comprise hydrocarbons having 2 to 12 carbon atoms as the main component thereof, small amounts of other kinds of hydrocarbon may be comprised as well. More specific examples of the hydrocarbons having 2 to 12 carbon atoms are paraffinic hydrocarbons, such as ethane, propane, butane, pentane, hexane, heptane, octane, nonane, decane and the like, and olefinic hydrocarbons, such as ethylene, propylene, butene-1, butene-2, 2-methylpropene, pentene-1, hexene-1, heptene-1, octene-1, nonene-1, decene-1 and the like.

The reaction of the process of the invention is conducted at a temperature generally of 200° to 800° C., preferably of 400° to 650° C., at a pressure generally of 0 to 30 kg/cm$^2$G, preferably of 0 to 10 kg/cm$^2$G. The reaction is preferably conducted by a continuous (flow) process though it may be conducted by a batch process as well. It is preferably conducted in a gas phase though it may be conducted in a liquid phase as well. The catalyst may be utilized in the reaction system either as a fixed bed process, as a moving bed process or as a fluidized bed process. When the reaction is conducted in a continuous process, the amount of the catalyst utilized in the process expressed by the weight hourly space velocity (WHSV) is generally in the range from 0.1 to 100 hr$^{-1}$ and preferably in the range from 1 to 10 hr$^{-1}$. Hydrogen gas or an inert gas (such as nitrogen gas) may be introduced in the reaction system as the diluent.

To summarize the advantages obtained by the invention, the process of the invention is simple and suited for general application and the catalyst can be prepared at a low cost. Thus, aromatic hydrocarbons can be produced efficiently from the material hydrocarbons by bringing them into contact with the modified galloaluminosilicate having the excellent catalytic activity. The process of the invention can be adopted widely and effectively in the petroleum refining, in the petroleum chemistry and in the chemical industry in general.

The invention will be understood more readily with reference to the following examples; however, these examples are intended to illustrate the invention and are not to be construed to limit the scope of the invention.

EXAMPLE OF PREPARATION OF CATALYST 1

[Preparation of crystalline galloaluminosilicate I]

Solutions A, B and C were prepared separately. Solution A was prepared by dissolving 211 g of water glass into 180 g of water. Solution B was prepared by dissolving 4.6 g of gallium nitrate, 18.8 g of aluminum sulfate, 9.1 g of concentrated sulfuric acid and 26.4 g of tetrapropylammonium bromide into 320 g of water. Solution C was prepared by dissolving 80 g of sodium chloride into 122 g of water.

The above Solutions A and B were simultaneously dropped into Solution C in small portions at the room temperature to form a mixed solution. After the dropping of the solutions was finished, concentrated sulfuric acid was added to the mixed solution to adjust pH of the solution to 9.5 and the mixed solution was treated under a hydrothermal reaction at 170° C. for 46 hours in an autoclave. After the reaction product was cooled, a precipitated product was separated by filtration, washed with water and dried at 120° C. for 12 hours.

It was confirmed by the X-ray diffraction pattern that the solid product thus obtained had the ZSM-5 type (MFI type) structure.

The solid reaction product was calcined at 550° C. for 6 hours, subjected to an ion-exchange treatment using a 1 N aqueous solution of ammonium nitrate at 80° C. for 4 hours, filtered, washed with water and dried at 120° C. The operations of the calcination, the ion exchange treatment and the drying described above were further repeated to obtain an ammonium type crystalline galloaluminosilicate.

Analysis of the galloaluminosilicate thus obtained showed that it had the composition: $SiO_2:Al_2O_3:Ga_2O_3=90:2.5:0.5$ (mol ratio).

EXAMPLE OF PREPARATION OF CATALYST 2

[Preparation of crystalline galloaluminosilicate II]

A solid reaction product was obtained after the hydrothermal reaction by the same method as in Example of Preparation of Catalyst 1 except that 9.7 g of aluminum sulfate and 6.1 g of gallium nitrate were used.

It was confirmed by the X-ray diffraction pattern that the solid product thus obtained had the ZSM-5 type (MFI type) structure.

The reaction product was calcined at 550° C. for 6 hours, subjected to an ion-exchange treatment using a 1N aqueous solution of ammonium nitrate at 80° C. for 4 hours, filtered, washed with water and dried at 120° C. The operations of the calcination, the ion exchange treatment and the drying described above were further repeated to obtain an ammonium type crystalline galloaluminosilicate.

Analysis of the galloaluminosilicate thus obtained showed that it had the composition: $SiO_2:Al_2O_3:Ga_2O_3=90:1.8:0.8$ (tool ratio).

EXAMPLE 1

(1) Modification of the galloaluminosilicate I

The crystalline galloaluminosilicate I prepared in Example of Preparation of Catalyst I described above was impregnated with concentrated sulfuric acid by dropping the acid to the silicate, dried at 120° C. for 12 hours and calcined at 550° C. for 4 hours in a dry air stream to obtain a modified crystalline galloaluminosilicate.

(2) Evaluation of the catalytic activity

[Preparation of aromatic hydrocarbons]

The catalytic activity on the aromatization of hydrocarbons was evaluated by using aromatization of n-hexane as an example.

The modified crystalline galloaluminosilicate obtained in Example 1 (1) described above was used as the catalyst and n-hexane was used as the reactant. The reaction was conducted in an isothermal reactor at the temperature of 500° C., the WHSV (weight hourly space velocity) of 2.0 $hr^{-1}$ and the pressure of 1 atmosphere for 2 hours to obtain the result shown in Table 1.

EXAMPLE 2

(1) Modification of the galloaluminosilicate I

The crystalline galloaluminosilicate I prepared in Example of Preparation of Catalyst 1 described above was impregnated with a 1N aqueous solution of ammonium sulfate by dropping the solution to the silicate, dried at 120° C. for 12 hours and calcined at 550° C. for 4 hours in a dry air stream to obtain a modified crystalline galloaluminosilicate.

(2) Evaluation of the catalytic activity

[Preparation of aromatic hydrocarbons]

The modified crystalline galloaluminosilicate obtained in Example 2 (1) described above was used as the catalyst and n-hexane was used as the reactant. The reaction was conducted in an isothermal reactor at the temperature of 500° C., the WHSV of 2.0 $hr^{-1}$ and the pressure of 1 atmosphere for 2 hours to obtain the result shown in Table 1.

EXAMPLE 3

(1) Modification of the galloaluminosilicate I

The crystalline galloaluminosilicate I prepared in Example of Preparation of Catalyst 1 described above was refluxed in a 1N aqueous solution of ammonium sulfate at 80° C. for 4 hours, just filtered, dried at 120° C. for 12 hours and calcined at 550° C. for 4 hours in a dry air stream to obtain a modified crystalline galloaluminosilicate.

(2) Evaluation of the catalytic activity

[Preparation of aromatic hydrocarbons]

The modified crystalline galloaluminosilicate obtained in Example 3 (1) described above was used as the catalyst and n-hexane was used as the reactant. The reaction was conducted in an isothermal reactor at the temperature of 500° C., the WHSV of 2.0 $hr^{-1}$ and the pressure of 1 atmosphere for 2 hours to obtain the result shown in Table 1.

EXAMPLE 4

(1) Modification of the galloaluminosilicate I

The crystalline galloaluminosilicate I prepared in Example of Preparation of Catalyst 1 described above was exposed to a stream of gas containing 0.2 volume % of hydrogen sulfide at 200° C. for 6 hours and calcined at 550° C. for 4 hours in a dry air stream to obtain a modified crystalline galloaluminosilicate.

(2) Evaluation of the catalytic activity

[Preparation of aromatic hydrocarbons]

The modified crystalline galloaluminosilicate obtained in Example 4 (1) described above was used as the catalyst and n-hexane was used as the reactant. The reaction was conducted in an isothermal reactor at the temperature of 500° C., the WHSV of 2.0 $hr^{-1}$ and the pressure of 1 atmosphere for 2 hours to obtain the result shown in Table 1.

EXAMPLE 5

(1) Modification of the galloaluminosilicate I

The crystalline galloaluminosilicate I prepared in Example of Preparation of Catalyst 1 described above was impregnated with concentrated sulfuric acid by dropping the acid to the silicate, dried at 120° C. for 12 hours and calcined at 350° C. for 4 hours in a dry air stream to obtain a modified crystalline galloaluminosilicate.

(2) Evaluation of the catalytic activity

[Preparation of aromatic hydrocarbons]

The modified crystalline galloaluminosilicate obtained in Example 5 (1) described above was used as the catalyst and n-hexane was used as the reactant. The reaction was conducted in an isothermal reactor at the temperature of 500° C., the WHSV of 2.0 $hr^{-1}$ and the pressure of 1 atmosphere for 2 hours to obtain the result shown in Table 1.

EXAMPLE 6

(1) Modification of the galloaluminosilicate I

The crystalline galloaluminosilicate I prepared in Example of Preparation of Catalyst 1 described above was impregnated with a 1N aqueous solution of ammonium sulfate by dropping the solution to the silicate, dried at 120° C. for 12 hours and calcined at 350° C. for 4 hours in a dry air stream to obtain a modified crystalline galloaluminosilicate.

(2) Evaluation of the catalytic activity
[Preparation of aromatic hydrocarbons]

The modified crystalline galloaluminosilicate obtained in Example 6 (1) described above was used as the catalyst and n-hexane was used as the reactant. The reaction was conducted in an isothermal reactor at the temperature of 500° C., the WHSV of 2.0 $hr^{-1}$ and the pressure of 1 atmosphere for 2 hours to obtain the result shown in Table 1.

EXAMPLE 7

(1) Modification of the galloaluminosilicate I

The crystalline galloaluminosilicate I prepared in Example of Preparation of Catalyst 1 described above was impregnated with diethyl sulfate by dropping the sulfate to the silicate, dried at 120° C. for 12 hours and calcined at 550° C. for 4 hours in a dry air stream to obtain a modified crystalline galloaluminosilicate.

(2) Evaluation of the catalytic activity
[Preparation of aromatic hydrocarbons]

The modified crystalline galloaluminosilicate obtained in Example 7 (1) described above was used as the catalyst and n-hexane was used as the reactant. The reaction was conducted in an isothermal reactor at the temperature of 500° C., the WHSV of 2.0 $hr^{-1}$ and the pressure of 1 atmosphere for 2 hours to obtain the result shown in Table 1.

EXAMPLE 8

(1) Modification of the galloaluminosilicate I

The crystalline galloaluminosilicate I prepared in Example of Preparation of Catalyst 1 described above was impregnated with diethyl sulfide by dropping the sulfide to the silicate, dried at 120° C. for 12 hours and calcined at 550° C. for 4 hours in a dry air stream to obtain a modified crystalline galloaluminosilicate.

(2) Evaluation of the catalytic activity
[Preparation of aromatic hydrocarbons]

The modified crystalline galloaluminosilicate obtained in Example 8 (1) described above was used as the catalyst and n-hexane was used as the reactant. The reaction was conducted in an isothermal reactor at the temperature of 500° C., the WHSV of 2.0 $hr^{-1}$ and the pressure of 1 atmosphere for 2 hours to obtain the result shown in Table 1.

EXAMPLE 9

(1) Modification of the galloaluminosilicate I

The crystalline galloaluminosilicate I prepared in Example of Preparation of Catalyst 1 described above was impregnated with thiophene by dropping thiophene to the silicate, dried at 120° C. for 12 hours and calcined at 550° C. for 4 hours in a dry air stream to obtain a modified crystalline galloaluminosilicate.

(2) Evaluation of the catalytic activity
[Preparation of aromatic hydrocarbons]

The modified crystalline galloaluminosilicate obtained in Example 9 (1) described above was used as the catalyst and n-hexane was used as the reactant. The reaction was conducted in an isothermal reactor at the temperature of 500° C., the WHSV of 2.0 $hr^{-1}$ and the pressure of 1 atmosphere for 2 hours to obtain the result shown in Table 1.

COMPARATIVE EXAMPLE 1

(1) Modification of the galloaluminosilicate I

The crystalline galloaluminosilicate I prepared in Example of Preparation of Catalyst 1 described above was impregnated with concentrated nitric acid by dropping the acid to the silicate, dried at 120° C. for 12 hours and calcined at 550° C. for 4 hours in a dry air stream to obtain a modified crystalline galloaluminosilicate.

(2) Evaluation of the catalytic activity
[Preparation of aromatic hydrocarbons]

The modified crystalline galloaluminosilicate obtained in Comparative Example I (1) described above was used as the catalyst and n-hexane was used as the reactant. The reaction was conducted in an isothermal reactor at the temperature of 500° C., the WHSV of 2.0 $hr^{-1}$ and the pressure of I atmosphere for 2 hours to obtain the result shown in Table 1.

REFERENCE EXAMPLE 1

(1) Modification of the galloaluminosilicate I

The crystalline galloaluminosilicate I prepared in Example of Preparation of Catalyst 1 described above was calcined at 550° C. for 4 hours in a dry air stream to obtain a modified crystalline galloaluminosilicate.

(2) Evaluation of the catalytic activity
[Preparation of aromatic hydrocarbons]

The modified crystalline galloaluminosilicate obtained in Reference Example 1 (1) described above was used as the catalyst and n-hexane was used as the reactant. The reaction was conducted in an isothermal reactor at the temperature of 500° C., the WHSV of 2.0 $hr^{-1}$ and the pressure of 1 atmosphere for 2 hours to obtain the result shown in Table 1.

TABLE 1

| | method of modification | | | yield of aromatics (weight %) |
|---|---|---|---|---|
| | sulfur-containing substance | method of treatment | calcination temperature | |
| Example 1 | conc. sulfuric acid | impregnation | 550°C. | 62.0 |
| Example 2 | 1 N aq. soln. of ammonium sulfate | impregnation | 550°C. | 60.3 |
| Example 3 | 1 N aq. soln. of ammonium sulfate | refluxing | 550°C. | 60.0 |
| Example 4 | H$_2$S | gas flow | 550°C. | 58.7 |
| Example 5 | conc. sulfuric acid | impregnation | 350°C. | 61.5 |
| Example 6 | 1 N aq. soln. of ammonium sulfate | impregnation | 350°C. | 60.0 |
| Example 7 | diethyl sulfate | impregnation | 550°C. | 60.5 |
| Example 8 | diethyl sulfide | impregnation | 550°C. | 58.5 |
| Example 9 | thiophene | impregnation | 550°C. | 59.1 |
| Comparative Example 1 | conc. nitric acid | impregnation | 550°C. | 44.9 |
| Reference Example 1 | none | none | 550°C. | 45.4 |

EXAMPLE 10

(1) Modification of the galloaluminosilicate II

The crystalline galloaluminosilicate II prepared in Example of Preparation of Catalyst 2 described above was impregnated with a 1N aqueous solution of ammonium sulfate by dropping the solution to the silicate, dried at 120° C. for 12 hours and calcined at 550° C. for 4 hours in a dry air stream to obtain a modified crystalline galloaluminosilicate.

(2) Evaluation of the catalytic activity
[Preparation of aromatic hydrocarbons]

The modified crystalline galloaluminosilicate obtained in Example 10 (1) described above was used as the catalyst and n-hexane was used as the reactant. The reaction was conducted in an isothermal reactor at the temperature of 500° C., the WHSV of 2.0 hr$^{-1}$ and the pressure of 1 atmosphere for 2 hours to obtain the result shown in Table 2.

EXAMPLE 11

(1) Modification of the galloaluminosilicate II

The crystalline galloaluminosilicate II prepared in Example of Preparation of Catalyst 2 described above was refluxed in a 1N aqueous solution of ammonium sulfate at 80° C. for 4 hours, just filtered, dried at 120° C. for 12 hours and calcined at 550° C. for 4 hours in a dry air stream to obtain a modified crystalline galloaluminosilicate.

(2) Evaluation of the catalytic activity
[Preparation of aromatic hydrocarbons]

The modified crystalline galloaluminosilicate obtained in Example 11 (1) described above was used as the catalyst and n-hexane was used as the reactant. The reaction was conducted in an isothermal reactor at the temperature of 500° C., the WHSV of 2.0 hr$^{-1}$ and the pressure of 1 atmosphere for 2 hours to obtain the result shown in Table 2.

EXAMPLE 12

(1) Modification of the galloaluminosilicate II

The crystalline galloaluminosilicate II prepared in Example of Preparation of Catalyst 2 described above was impregnated with concentrated sulfuric acid by dropping the acid to the silicate, dried at 120° C. for 12 hours and calcined at 550° C. for 4 hours in a dry air stream to obtain a modified crystalline galloaluminosilicate.

(2) Evaluation of the catalytic activity
[Preparation of aromatic hydrocarbons]

The modified crystalline galloaluminosilicate obtained in Example 12 (1) described above was used as the catalyst and n-hexane was used as the reactant. The reaction was conducted in an isothermal reactor at the temperature of 500° C., the WHSV of 2.0 hr$^{-1}$ and the pressure of 1 atmosphere for 2 hours to obtain the result shown in Table 2.

EXAMPLE 13

(1) Modification of the galloaluminosilicate II

The crystalline galloaluminosilicate II prepared in Example of Preparation of Catalyst 2 described above was exposed to a stream of gas containing 0.2 volume % of hydrogen sulfide at 200° C. for 6 hours and calcined at 550° C. for 4 hours in a dry air stream to obtain a modified crystalline galloaluminosilicate.

(2) Evaluation of the catalytic activity
[Preparation of aromatic hydrocarbons]

The modified crystalline galloaluminosilicate obtained in Example 13 (1) described above was used as the catalyst and n-hexane was used as the reactant. The reaction was conducted in an isothermal reactor at the temperature of 500° C., the WHSV of 2.0 hr$^{-1}$ and the pressure of 1 atmosphere for 2 hours to obtain the result shown in Table 2.

EXAMPLE 14

(1) Modification of the galloaluminosilicate II

The crystalline galloaluminosilicate II prepared in Example of Preparation of Catalyst 2 described above was impregnated with diethyl sulfate by dropping the sulfate to the silicate, dried at 120° C. for 12 hours and calcined at 550° C. for 4 hours in a dry air stream to obtain a modified crystalline galloaluminosilicate.

(2) Evaluation of the catalytic activity
[Preparation of aromatic hydrocarbons]

The modified crystalline galloaluminosilicate obtained in Example 14 (1) described above was used as the catalyst and n-hexane was used as the reactant. The reaction was conducted in an isothermal reactor at the temperature of 500° C., the WHSV of 2.0 hr$^{-1}$ and the pressure of 1 atmosphere for 2 hours to obtain the result shown in Table 2.

COMPARATIVE EXAMPLE 2

(1) Modification of the galloaluminosilicate II

The crystalline galloaluminosilicate II prepared in Example of Preparation of Catalyst 2 described above was impregnated with concentrated nitric acid by dropping the acid to the silicate, dried at 120° C. for 12 hours and calcined at 550° C. for 4 hours in a dry air stream to obtain a modified crystalline galloaluminosilicate.

(2) Evaluation of the catalytic activity
[Preparation of aromatic hydrocarbons]

The modified crystalline galloaluminosilicate obtained in Comparative Example 2 (1) described above was used as the catalyst and n-hexane was used as the reactant. The reaction was conducted in an isothermal reactor at the temperature of 500° C., the WHSV of 2.0 hr$^{-1}$ and the pressure of 1 atmosphere for 2 hours to obtain the result shown in Table 2.

REFERENCE EXAMPLE 2

(1) Modification of the galloaluminosilicate II

The crystalline galloaluminosilicate II prepared in Example of Preparation of Catalyst 2 described above was calcined at 550° C. for 4 hours in a dry air stream to obtain a modified crystalline galloaluminosilicate.

(2) Evaluation of the catalytic activity
[Preparation of aromatic hydrocarbons]

The modified crystalline galloaluminosilicate obtained in Reference Example 2 (1) described above was used as the catalyst and n-hexane was used as the reactant. The reaction was conducted in an isothermal reactor at the temperature of 500° C., the WHSV of 2.0 hr$^{-1}$ and the pressure of 1 atmosphere for 2 hours to obtain the result shown in Table 2.

TABLE 2

| | method of modification | | yield of |
|---|---|---|---|
| | sulfur-containing substance | method of treatment | aromatics (weight %) |
| Example 10 | 1 N aq. soln. of ammonium sulfate | impregnation | 60.0 |
| Example 11 | 1 N aq. soln. of ammonium sulfate | refluxing | 59.6 |
| Example 12 | conc. sulfuric acid | impregnation | 60.2 |
| Example 13 | H$_2$S | gas flow | 59.1 |
| Example 14 | diethyl sulfate | impregnation | 60.0 |
| Comparative Example 2 | conc. nitric acid | impregnation | 42.7 |
| Reference Example 2 | none | none | 42.1 |

While the invention has been particularly shown and described with reference to preferred embodiments thereof, it will be understood by those skilled in the art that the foregoing and other changes in form and details can be made therein without departing from the spirit and scope of the invention.

What is claimed is:

1. A process for producing aromatic hydrocarbons which comprises contacting a hydrocarbon selected from the group consisting of ethane, propane, butane, pentane, hexane, heptane, octane, nonane, decane, ethylene, propylene, butene-1, butene-2, 2-methylpropene, pentene-1, hexene-1, heptene-1, octene-1, nonene-1 and decene-1 with a modified galloaluminosilicate catalyst having a ZSM-5 structure at a reaction temperature of 200° to 800° C., under a reaction pressure of 0 to 30 kg/cm$^2$G and at a weight hourly space velocity of 0.1 to 100 hour$^{-1}$, said modified galloaluminosilicate catalyst being prepared by treating a crystalline galloaluminosilicate having a mole ratio of SiO$_2$/(Ga$_2$O$_3$+Al$_2$O$_3$) of 5 to 1000 with a sulfur-containing substance selected from the group consisting of sulfuric acid, ammonium sulfate, hydrogen sulfide, dimethyl sulfide, diethyl sulfide, ethyl mercaptan, diethyl sulfate, thioacetic acid and thiophene, followed by calcining the treated galloaluminosilicate at a calcination temperature of 300° to 700° C.

2. The process according to claim 1, wherein the mole ratio of SiO$_2$/(Ga$_2$O$_3$+Al$_2$O$_3$) is 10 to 500.

3. The process according to claim 1, wherein the calcining is carried out at a temperature of 350° to 600° C. for 1 to 6 hours.

4. The process according to claim 1, wherein reaction temperature is 400° to 650° C. and the reaction pressure is 0 to 10 kg/cm$^2$G.

5. The process according to claim 1, wherein the weight hourly space velocity is 1 to 10 hour$^{-1}$.

6. The process according to claim 2, wherein the calcining is carried out at a temperature of 350° to 600° C. for 1 to 6 hours; the reaction temperature is 400° to 650° C.; the reaction pressure is 0 to 10 kg/cm$^2$G and the weight hourly space velocity is 1 to 10 hour$^{-1}$.

7. A process for producing aromatic hydrocarbons which comprises contacting a hydrocarbon selected from the group consisting of ethane, propane, butane, pentane, hexane, heptane, octane, nonane, decane, ethylene, propylene, butene-1, butene-2, 2-methylpropene, pentene-1, hexene-1, heptene-1, octene-1, nonene-1 and decene-1 with a modified galloaluminosilicate catalyst having a ZSM-5 structure at a reaction temperature of 200° to 800° C., under a reaction pressure of 0 to 30 kg/cm$^2$G, said modified galloaluminosilicate catalyst being prepared by treating a crystalline galloaluminosilicate having a mole ratio of SiO$_2$/(Ga$_2$O$_3$+Al$_2$O$_3$) of 5 to 1000 with a sulfur-containing substance selected from the group consisting of sulfuric acid, ammonium sulfate, hydrogen sulfide, methyl sulfide, ethyl sulfide, ethyl mercaptan, diethyl sulfate, thioacetic acid and thiophene, followed by calcining the treated galloaluminosilicate at a calcination temperature of 300° to 700° C.

* * * * *